United States Patent [19]

Müller et al.

[11] Patent Number: 4,474,310

[45] Date of Patent: Oct. 2, 1984

[54] APPARATUS FOR PRODUCING A REACTION MIXTURE

[75] Inventors: Heinz Müller, Leverkusen; Reiner Raffel, Siegburg; Ferdinand Althausen, Neunkirchen, all of Fed. Rep. of Germany

[73] Assignees: Bayer Aktiengesellschaft; Maschinenfabrik & Hennecke GmbH, both of Leverkusen, Fed. Rep. of Germany

[21] Appl. No.: 370,450

[22] Filed: Apr. 21, 1982

[30] Foreign Application Priority Data

May 2, 1981 [DE] Fed. Rep. of Germany ....... 3117376

[51] Int. Cl.$^3$ .............................................. B67D 5/60
[52] U.S. Cl. .................................... 222/145; 251/332; 251/122
[58] Field of Search ................ 222/129, 144.5, 145, 222/135, 504; 251/84, 85, 332, 318, 118, 122, 62, 63.5; 239/303

[56] References Cited

U.S. PATENT DOCUMENTS

| | | | |
|---|---|---|---|
| 2,526,735 | 10/1950 | Duce | 222/504 |
| 3,057,372 | 10/1962 | Sutton et al. | 251/332 |
| 3,095,900 | 7/1963 | Newhall | 251/332 |
| 3,168,217 | 2/1965 | Nilsen et al. | 222/145 |
| 3,223,100 | 3/1966 | Peterson | 222/135 |
| 3,409,174 | 11/1968 | Radcliffe et al. | 222/145 |
| 3,858,852 | 1/1975 | Breer et al. | 259/125 |
| 4,099,652 | 7/1978 | Breer | 259/4 |
| 4,368,847 | 1/1983 | Ersfeld | 239/125 |

FOREIGN PATENT DOCUMENTS 2302460 10/1976 France ........................ 251/332

Primary Examiner—Joseph J. Rolla
Assistant Examiner—Kenneth Noland
Attorney, Agent, or Firm—Gene Harsh; Joseph C. Gil

[57] ABSTRACT

The present invention is directed to an apparatus for producing a reaction mixture from at least two fluid components comprising: (A) a storage container for each component; (B) feed pipes leading from each storage container via metering pumps to injection nozzles; (C) return pipes leading from each injection nozzle to the storage containers; (D) the injection nozzles opening into the mixing chamber of a mixhead, the mixhead having an outlet opening downstream of the injection nozzles, each injection nozzle comprising (i) a housing, (ii) a bore arranged in the housing, the bore connected to a feed pipe and a return pipe, (iii) a nozzle needle within the bore, the nozzle needle being provided with (a) an annular groove for connecting the feed pipe and the return pipe, (b) a sealing surface, and (c) a needle spindle, (iv) a sealing surface in the housing, the sealing surface adapted to contact the sealing surface of the nozzle needle, and (v) a central nozzle bore located in the sealing surface (vi) wherein the needle spindle is adapted to pass into and/or through the central nozzle bore; characterized in the (E) the nozzle needle and the needle spindle are separate parts, wherein the needle spindle consists of a ductile, highly elastic steel and is replaceably-mounted in the nozzle needle and surrounded by a recess formed in the nozzle needle.

7 Claims, 5 Drawing Figures

APPARATUS FOR PRODUCING A REACTION MIXTURE

The invention relates to an apparatus for producing a reaction mixture from at least two fluid reaction components comprising:
(A) a storage means for each component;
(B) feed pipes leading from each storage means via metering pumps to injection nozzles;
(C) return pipes leading from each injection nozzle to said storage means;
(D) said injection nozzles opening into the mixing chamber of a mixhead, said mixhead having an outlet opening downstream of said injection nozzles, each injection nozzle comprising
  (i) a housing;
  (ii) a bore arranged in said housing, said bore connected to a feed pipe and a return pipe;
  (iii) a nozzle needle within said bore, said nozzle needle being provided with
    (a) an annular groove for connecting the feed pipe and the return pipe;
    (b) a sealing surface, and
    (c) a needle spindle;
  (iv) a sealing surface in said housing, said sealing surface adapted to contact the sealing surface of said nozzle needle; and
  (v) a central nozzle bore located in said sealing surface (iv), wherein said needle spindle is adapted to pass into and/or through said central nozzle bore.

BACKGROUND OF THE INVENTION

In the manufacture of small moldings, for which production of the relatively small quantities of reaction mixture is required, the throughflow time, (i.e., the time required to produce a certain amount of mixture from the reaction components) cannot be arbitrarily reduced in order that the components have sufficient mixing time. Attempts have therefore been made to make the nozzle bores of the injection nozzles as small as possible. The diameters of the spindles of the needle nozzles had to be adapted accordingly.

With decreasing spindle diameters, the difficulties involved in the manufacture of these spindles increase due to the problems which arise during the hardening process at the junction between the spindle and the nozzle stem because of the difference in their diameters. Even in the cases where nondistorting nozzle needles with spindles are used, the spindle is in danger of being permanently deformed or even broken by even the smallest of foreign bodies in or around the nozzle bore. The danger of damage is greater, the smaller the spindle diameter.

Although it has been possible to produce and use nozzle needles with a spindle down to 0.8 mm in diameter, the manufacturing difficulties have become so serious and the frequency of spindle breaks has become so great that the number of nozzle needles which have had to be rejected after production and the operational difficulties caused by spindle fractures and destruction of the nozzle bores have become unacceptable. The object of the present invention is to structurally improve the injection nozzles used in apparatus of the above-mentioned type to such an extent that the nozzle needles can be produced without an unacceptable level of rejects and that the spindles show high resistance to breakage, even when very small in diameter.

DESCRIPTION OF THE INVENTION

Figure 1:
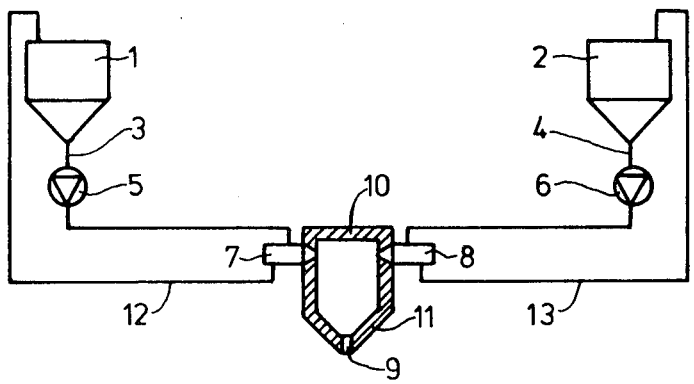
FIG. 1 illustrates the apparatus as a whole.

The present invention is directed to an apparatus for producing a reaction mixture from at least two fluid reaction components comprising
(A) a storage means for each component;
(B) feed pipes leading from each storage means via metering pumps to injection nozzles;
(C) return pipes leading from each injection nozzle to said storage means;
(D) said injection nozzles opening into the mixing chamber of a mixhead, said mixhead having an outlet opening downstream of said injection nozzles, each injection nozzle comprising
  (i) a housing,
  (ii) a bore arranged in said housing, said bore connected to a feed pipe and a return pipe,
  (iii) a nozzle needle within said bore, said nozzle needle being provided with
    (a) an annular groove for connecting the feed pipe and the return pipe;
    (b) a sealing surface, and
    (c) a needle spindle,
  (iv) a sealing surface in said housing, said sealing surface adapted to contact the sealing surface of said nozzle needle, and
  (v) a central nozzle bore located in said sealing surface (iv), wherein said needle spindle is adapted to pass into and/or through said central nozzle bore;
characterized in that
  (E) the nozzle needle and the needle spindle are separate parts wherein the needle spindle consists of a ductile, highly elastic steel and is replaceably-mounted in the nozzle needle and surrounded by a recess formed in the nozzle needle.

Since the nozzle needle and the needle spindle are separate, different materials may be used for these two components in order that, if necessary, the two components may be separately hardened and if a spindle should break, it may readily be replaced.

The nozzle needles may be made of the materials commonly used for this purpose. Cold or high-speed tool steels may be used as the material for the needle spindle (see, for example, "Stahlschlussel", 1977, Verlag Stahlschlussel Wegst KG, D-7142 Marbach). Examples of tool steels which may be used include the cold tool steel classified under German Material No. 1.2516 (DIN designation 120 WV 4) and the high-speed steel classified under German Material No. 1.3343 (DIN designation S 6-5-2 (DMo 5)), corresponding to U.S. Material No. 46 (U.S. standard AISE M2).

The advantage of the recess, which is preferably concentric around the needle spindle, is that it permits the needle spindle to undergo elastic deformation, within limits, without breaking by virtue of its free length. The recess may be in the form of a uniform hollow annular groove or it may widen in the form of a funnel toward the sealing face. The latter embodiment has the advantage over the cylindrical annular groove in that, in the event of transverse stressing or deformation of the needle spindle, the spindle can deform tangentially to the wall of the widened recess.

The recess preferably accommodates a filling of an elastomeric material, such as silicone rubber of suitable elasticity, which ensures that no deposits capable of adversely affecting the flexibility of the spindle are able to settle in the recess. The filling must, however, be elastic to such an extent that it does not offer excessive resistance to the flexibility of the needle spindle.

The filling may project beyond the sealing surface of the nozzle needle when the nozzle bore is open and thus, given that the projecting length is adapted to the elasticity of the filling material and to the speed at which the nozzle needle opens and closes, provide another means of influencing the opening and closing times of the nozzle.

The length of the needle spindle which projects from the nozzle needle is preferably adjustable. In this way, it is possible for the recirculation and injection positions to coincide with one another when the nozzles are opened and closed.

In one embodiment, the nozzle needle is in the form of a sleeve through the bore of which the needle spindle is pushed so that it strikes against a socket head. The needle spindle may then be fixed in place by means of a nut designed to be screwed towards the socket head. If shorter free lengths of the needle spindle are desired than maximum projecting length, one or more washers of suitable thickness may be threaded onto the needle spindle and then the needle spindle may be pushed into the sleeve-like nozzle needle recess and fixed into position. In this way, the washers reduce the projecting length of the needle spindle.

In another embodiment, the needle spindle is held in place by a collet-like fastening.

The apparatus according to the invention and various embodiments of the nozzle are described in detail in the following with reference to the accompanying drawings.

As shown in FIG. 1, feed pipes 3 and 4 lead from storage vessels 1 and 2 for the components (which would be polyol and isocyanate when the reaction mixture is to be a polyurethane) via metering pumps 5 and 6 to injection nozzles 7 and 8 which open into the mixing chamber 10 within mixing head 11, which has an outlet opening 9.

Figure 2:
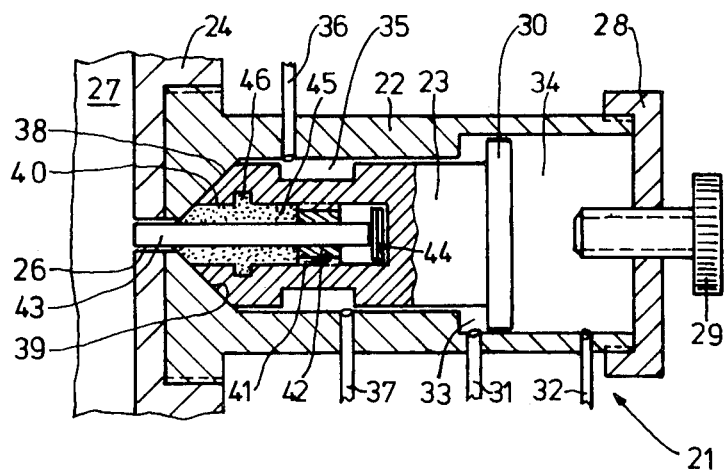
FIG. 2 is a longitudinal section of a first embodiment of the nozzle in its closed position.
Figure 3:
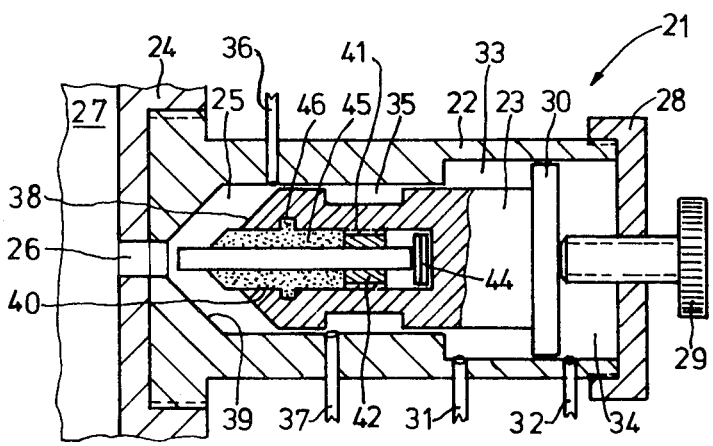
FIG. 3 is a longitudinal section of the same nozzle in its open position.

As shown in FIGS. 2 and 3, the injection nozzle 21 consists essentially of a housing 22 and of a nozzle needle 23 within a longitudinal guide bore 25 therein. The housing 22 is screwed into the housing 24 of the mixing chamber (as indicated in the drawing). A nozzle bore 26 connects the guide bore 25 with the mixing chamber 27. The end of the guide bore 25 opposite the nozzle bore 26 is closed by means of a screw cap 28. An adjusting screw 29 is used for limiting the stroke length of the nozzle needle 23.

The end of the nozzle needle 23 is attached to a double-acting hydraulic piston 30 with hydraulic chambers 33 and 34, which in turn, are served by fluid connectors 31 and 32. The nozzle needle 23 is provided with a concentric annular groove 35 which, in the closed position of the nozzle needle 23, connects the feed pipe 36 to the return pipe 37 (FIG. 2). The face of the nozzle needle 23 is in the form of a hardened sealing surface 38 which cooperates with a hardened sealing surface 39 of the housing 22.

The nozzle needle 23 is provided with a centrally arranged recess 40 which is formed with a screwthreaded section 41. A screwthreaded collet-like fastening 42 is screwed into the screwthreaded section 41, firmly holding a spindle 43 which is 0.8 mm in diameter and made of a highly elastic cold tool steel according to DIN 120 WV4 (cf. Stahlschlussel, Verlag Stahlschlussel Wegst KG, 1977, page 175, Material No. 1.2516). Although wear-resistant, this steel is so flexible that transverse or flexural stressing of the spindle 43 over a range such as may be encountered in practice does not result in breakage. The needle spindle 43 projects from the screwthreaded collet 42 through the recess 40 and beyond so that, when the needle 23 is in the closed position, the spindle projects sealingly into the nozzle bore 26 by a predetermined distance. The size of this distance may be adjusted exactly by threading one or more shims 44 onto the spindle 43. This adjustability is important for avoiding or, if necessary, facilitating a certain overlap in the flow of the component into the mixing chamber 27 or into the return pipe 37 during the movements of the nozzle needle 23.

The recess 40 which extends about 15 mm along the spindle from the screwthreaded collet 42 toward the nozzle bore allows the needle spindle 43 a sufficient length in which to bend in the event of transverse stressing and thus reduce the danger of breakage of the needle.

The recess 40 is occupied by a filling 45 of highly wear-resistant silicone rubber which is prevented from sliding by a groove 46 provided in the recess 40. The filling 45 prevents any accumulation and hardening of material in the recess, whether by particles of solids entrained by the component or through the undesirable penetration of reaction mixture in the event of faults which would destroy the desired flexing capability of the needle. In the present case, the filling 45 projects slightly beyond the sealing face 38 of the nozzle needle 23 when the nozzle bore 26 is open. When the nozzle needle 23 is moved into the closed position, the filling 45 is compressed on contact with the sealing face 39, so that the flow of the component into the mixing chamber 27 is actually interrupted shortly before the sealing faces 38 and 39 come into contact with one another. When the nozzle needle 23 is opened, the nozzle bore 26 is actually opened shortly after the sealing effect of the sealing faces 38 and 39 is eliminated by virtue of the elastic form recovery of the filling 45. Providing the extent to which the filling 45 projects and its elasticity are suitably selected, this measure represents another parameter for influencing the overlap of component flow into the mixing chamber or the return pipe.

Since the filling 45 may readily be replaced, the mode of operation of the injection nozzle may quickly be adapted to meet special requirements in the component flow overlap by selecting a filling projecting to the appropriate extent. The fact that the overlap may be influenced by means of a projecting filling 45 is of particular advantage when, in the closed position of the nozzle needle 23, the needle spindle 43 does not project far enough into the nozzle bore 26 and therefore would permit an amount of reacting mixture to remain therein.

Figure 4:
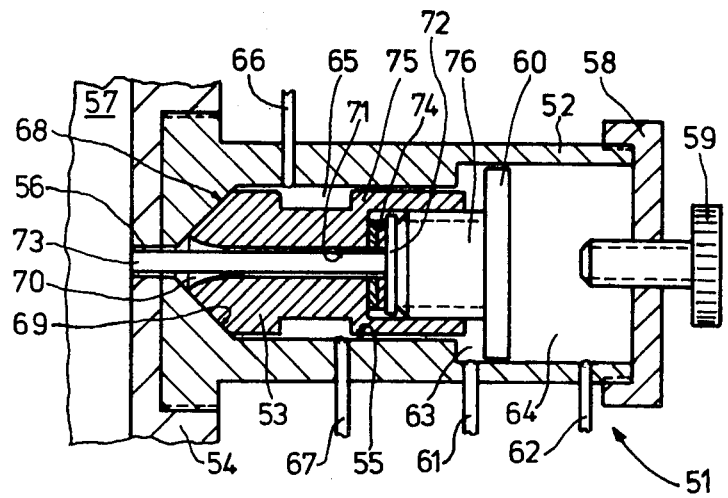
FIG. 4 is a longitudinal section of a second embodiment of the nozzle in its closed position.
Figure 5:
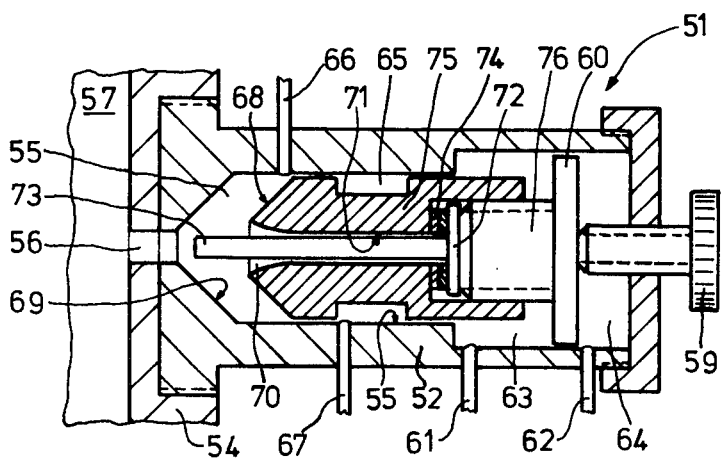
FIG. 5 is a longitudinal section of the same nozzle in its open position.

As shown in FIGS. 4 and 5, the injection nozzle 51 consists essentially of a housing 52 and of a nozzle needle 53 within a guide bore 55 running longitudinally therein. The housing 52 is screwed into the housing 54 of the mixing chamber (indicated in the drawing) on one end and is closed at the other by means of a screw cap 58. A nozzle bore 56 points into the mixing chamber 57. An adjusting screw 59 is used for adjusting the stroke length of the nozzle needle 53.

The nozzle needle 53 carries a double-acting hydraulic piston 60 with hydraulic chambers 63 and 64 and connections 61 and 62. The nozzle needle 53 is provided with a concentric annular groove 65 which, in the closed position of the nozzle needle 53, connects the feed pipe 66 to the return pipe 67 (FIG. 4). The face of the nozzle needle 53 is in the form of a hardened sealing face 68 which cooperates with a hardened sealing face 69 of the housing 52.

An annular recess 70 surrounds the needle spindle 73 in the nozzle needle 53 and widens in the shape of a trumpet towards the sealing surface 68. The smooth widening of the recess 70 has the advantage that, in the event of transverse stressing on the needle spindle 73, the spindle is not subjected to any concentrated load at the point where the recess 70 widens. In this case, the function of the recess 70 is to provide the projecting end of the needle spindle 73 with a greater free length. Extending back from the trumpet opening 70, the recess becomes a bore 71 which extends through the nozzle needle 53 and which serves as a mounting for the needle spindle 73 which is provided at its end with a socket head 72.

The needle spindle 73 is 1.3 mm in diameter and consists of high-speed steel (substantially equivalent to the tool steel of the first embodiment) corresponding to the classification M2 of U.S. AISE Standard DIN 120 WV4 and German Classification S 6-5-2 (DMo 5) (cf., Stahlschlussel, op. cit., page 159, No. 13343 and page 223, No. 46).

The length of that end of the spindle 73 which projects beyond the sealing face 68 of the nozzle needle 53 may be exactly adjusted by means of one or more shims 74 attached to the needle spindle on the end abutting the socket head 72. Adjustment of the length of the spindle by means of attaching the shims and the connection of the needle itself is easily accomplished as a threaded element 76 which is attached to the hydraulic piston 60 is screwed into the body 75 of the needle and may be easily removed and/or replaced.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for producing a reaction mixture from at least two fluid reaction components comprising:
   (A) a storage means for each component;
   (B) feed pipes leading from each storage means via metering pumps to injection nozzles;
   (C) return pipes leading from each injection nozzle to said storage means;
   (D) said injection nozzles opening into the mixing chamber of a mixhead, said mixhead having an outlet opening downstream of said injection nozzles, each injection nozzle comprising
      (i) a housing,
      (ii) a bore arranged in said housing, said bore connected to a feed pipe and a return pipe,
      (iii) a nozzle needle within said bore, said nozzle needle being provided with
         (a) an annular groove for connecting the feed pipe and the return pipe,
         (b) a sealing surface, and
         (c) a needle spindle,
      (iv) a sealing surface in said housing, said sealing surface adapted to contact the sealing surface of said nozzle needle, and
      (v) a central nozzle bore located in said sealing surface (iv), wherein said needle spindle is adapted to pass into and/or through said central nozzle bore;
   characterized in that
   (E) the nozzle needle and the needle spindle are separate parts, wherein the needle spindle consists of a ductile, highly elastic steel and is replaceably-mounted in the nozzle needle and surrounded by a recess formed in the nozzle needle.

2. The apparatus of claim 1, characterized in that the recess is in the form of an annular groove.

3. The apparatus of claim 1, characterized in that the recess widens towards the sealing face.

4. The apparatus of claim 1, characterized in that the length of the needle spindle which projects from the nozzle needle is adjustable.

5. The apparatus of claim 1, characterized in that the needle spindle is held in the nozzle needle by a collet-like fastening.

6. The apparatus of claim 1, characterized in that the recess is occupied by a filling of an elastomeric material.

7. The apparatus of claim 6, characterized in that, when the nozzle bore is open, the filling projects beyond the sealing face of the nozzle needle.

* * * * *